United States Patent
Lin et al.

(10) Patent No.: US 7,931,391 B2
(45) Date of Patent: Apr. 26, 2011

(54) BACKLIGHT MODULE

(75) Inventors: Wei-Chi Lin, Taipei County (TW); Sheng-Chieh Chao, Taoyuan County (TW); Chien-Yu Wei, Taichung County (TW); Po-Fu Kuo, Taipei (TW); Hui-Ju Hsu, Taichung County (TW)

(73) Assignee: Chunghwa Picture Tubes, Ltd, Taoyuan (TW)

( * ) Notice: Subject to any disclaimer, the term of this patent is extended or adjusted under 35 U.S.C. 154(b) by 0 days.

(21) Appl. No.: 12/789,451

(22) Filed: May 27, 2010

(65) Prior Publication Data
US 2010/0238649 A1    Sep. 23, 2010

Related U.S. Application Data

(62) Division of application No. 12/168,108, filed on Jul. 5, 2008, now Pat. No. 7,767,907.

(30) Foreign Application Priority Data

Oct. 29, 2007  (CN) .................... 2007 2 0193965 U

(51) Int. Cl.
*F21S 13/02* (2006.01)
(52) U.S. Cl. ...... 362/457; 362/97.1; 362/97.2; 362/630; 174/72 A

(58) Field of Classification Search .............. 362/97.1, 362/457, 391, 630–631, 97.2–97.3; 349/58; 174/72 A; 439/451
See application file for complete search history.

(56) References Cited

U.S. PATENT DOCUMENTS

| 6,991,349 B2 * | 1/2006 | Wang ........................... 362/362 |
| 7,232,952 B2 * | 6/2007 | Lin et al. ..................... 174/72 A |
| 2003/0117807 A1 * | 6/2003 | Hur et al. ...................... 362/457 |

FOREIGN PATENT DOCUMENTS
TW       1272436       * 11/2005
* cited by examiner

*Primary Examiner* — Robert May
(74) *Attorney, Agent, or Firm* — Jianq Chyun IP Office

(57) ABSTRACT

A backlight module includes a back plate structure, a light source disposed in the back plate structure, at least one wire connected to the light source, and at least one wire fixing frame fixed on the back plate structure. Each wire fixing frame includes a main part, a first fixing part disposed on a side of the main part, a second fixing part disposed on a side of the main part and opposite to the first fixing part, and an extending part extending in a direction from the second fixing part to the first fixing part. A wire outlet is defined between the extending part and the first fixed part, and a wire inlet is opposite to the wire outlet. A wire hold space is defined among the main part, the first fixing part, the second fixing part, and the back plate structure.

13 Claims, 9 Drawing Sheets

BACKLIGHT MODULE

CROSS-REFERENCE TO RELATED APPLICATION

This application is a divisional of an application Ser. No. 12/168,108, filed on Jul. 5, 2008, now pending, which claims the priority benefit of China application serial no. 200720193965.2, filed on Oct. 29, 2007. The entirety of each of the above-mentioned patent applications is hereby incorporated by reference herein and made a part of this specification.

BACKGROUND OF THE INVENTION

1. Field of the Invention

The invention relates to a backlight module. More particularly, the invention relates to a backlight module using a wire fixing frame in which a wire is not easy to be torn.

2. Description of Related Art

With the progress of science and technology, display technology has been developed rapidly, and light and thin flat panel displays (FPDs) are gradually replacing conventional thick and heavy cathode ray tube (CRT) displays. Normal FPDs include plasma display panels (PDPs) and liquid crystal displays (LCDs), which are both widely applied in PDAs, laptops, mobile phones, and televisions and so on.

Taking LCDs for example, an LCD includes a LCD panel and a backlight module. The LCD panel is composed by two transparent substrates and a liquid crystal layer disposed between the two transparent substrates, and the backlight module provides a light source required by the LCD panel, so as to realize the display effect of the LCD. Generally speaking, backlight modules are classified into a direct type and a side incident type.

Both conventional displays using CRTs and FPDs use many wires inside to transmit power or signals. In order to fix the wires in the displays, appropriate wire fixing structures will be designed inside the displays.

FIG. 1 is a schematic enlarged view of a part of a conventional wire fixing structure. Referring to FIG. 1, the wire fixing structure 120 includes a main fixing member 122 and an opening control member 124. The main fixing member 122 is connected to a frame 100, so as to form a fixing space between the main fixing member 122 and the frame 100. In addition, the opening control member 124 is connected to the frame 100, thus dividing the fixing space into a hold hole 126 and an inlet passage 128. The inlet passage 128 is of a convergent type towards a direction of the hold hole 126.

As the inlet passage 128 is of the convergent type towards the direction of the hold hole 126, a wire 140 can easily pass through the inlet passage 128 and slide into the hold hole 126. Therefore, when the wire 140 is torn to leave the hold hole 126, the opening control member 124 is under a force and urges the main fixing member 122, so as to limit the movement of the wire 140 in an X direction, and prevent the wire 140 from leaving the hold hole 126. However, this design fails to effectively limit the movement of the wire in both X and Y directions. Moreover, as some space still exists between the opening control member 124 and the main fixing member 122, the wire 140 can move in the X direction. Therefore, the convention wire fixing structure does not effectively fix the wire, and influences the efficiency of the backlight module at the same time.

SUMMARY OF THE INVENTION

The invention is directed to a backlight module, which has a wire fixing frame that improves the effect of wire fixing, so as to prevent the wires of the backlight from being torn broken in movement.

The invention provides a backlight module, which includes a back plate structure, a light source, at least one wire, and at least one wire fixing frame. The light source is disposed in the back plate structure, and the wire is connected to the light source. The wire fixing frame is fixed on the back plate structure. Each wire fixing frame includes a main part, a first fixing part, a second fixing part, and an extending part. The first fixing part is disposed on a side of the main part. An upper surface of the first fixing part protrudes from a surface of the main part and contacts with the back plate structure, and the first fixing part has a round corner in a central portion near the main part. The second fixing part is disposed on a side of the main part, and is opposite to the first fixing part. An upper surface of the second fixing part protrudes from the surface of the main part and contacts with the back plate structure. The extending part extends in a direction from the second fixing part to the first fixing part. A wire outlet is defined between the extending part and the first fixed part, and a wire inlet is opposite to the wire outlet. A wire hold space is defined among the main part, the first fixing part, the second fixing part, and the back plate structure. At least one wire passes from the wire inlet to the wire outlet through the wire hold space, and the at least one wire is fixed at a position by the round corner of the first fixing part and the extending part.

In one embodiment of the invention, a lower surface of the first fixing part has a recessed buckling member buckled on the back plate structure. Further, the back plate structure includes, for example, a limiting bump, and the limiting bump is buckled with the recessed buckling member.

In one embodiment of the invention, the backlight module further includes at least one locking member, the upper surface of the second fixing part has a fixing hole, and the second fixing part is fixed on the back plate structure through the fixing hole and the locking member.

In one embodiment, the main part, the first fixing part, the second fixing part, and the extending part are one-piece formed.

In one embodiment of the invention, the upper surface of the first fixing part is quadrangular.

In one embodiment of the invention, the extending part is a rectangular block.

In one embodiment of the invention, an end of the extending part is a rounded end.

In one embodiment of the invention, a height of the first fixing part is lower than a height of the second fixing part.

In one embodiment of the invention, a height of the extending part is equal to or similar to the height of the first fixing part.

The invention is further directed to providing a backlight module, which includes a back plate structure, a light source, a wire, and a wire fixing frame. The back plate structure has a limiting bump. The light source is disposed in the back plate structure, and the wire is connected to the light source. The wire fixing frame is disposed on the back plate structure, so as to position the wire by using the limiting bump and the wire fixing frame together. The wire fixing frame includes a main part, a first fixing part, and a second fixing part. The main part has a wire accommodation slot on a surface facing the back plate structure, and the wire is positioned between the wire accommodation slot and the back plate structure. The first fixing part is disposed on a side of the main part, and has a first limiting sidewall, a second limiting sidewall, and a step part. The first limiting sidewall and the second limiting sidewall form an included angle. One side of the step part has a third limiting sidewall connected to the first limiting sidewall and the second limiting sidewall, and the third limiting sidewall is substantially perpendicular to the first limiting sidewall and the second limiting sidewall. The other side of the step part abuts against the back plate structure. The limiting bump is buckled in the third limiting sidewall of the step part, and an inner edge of the limiting bump abuts against the first limiting sidewall and the second limiting sidewall. The second fixing part is disposed on the other side of the main part, and the second fixing part is fixed on the back plate structure through a positioning member.

In one embodiment of the invention, the first fixing part further includes two light leakage shielding pins disposed at two opposite sides of the step part respectively. The two side edges of the limiting bump are respectively supported on the light leakage shielding pins correspondingly.

In one embodiment of the invention, the limiting bump has a limiting wall and a connecting wall connected between the limiting wall and the back plate structure. The limiting wall is supported on the third limiting sidewall of the step part and has the same shape with the third limiting sidewall, and an inner edge of the limiting wall abuts against the first limiting sidewall and the second limiting sidewall.

In one embodiment of the invention, the second fixing part is fixed on the back plate structure by locking through a screw.

The invention uses a height structure of the round corner of the first fixing part, the extending part, and the wire hold space of the wire fixing frame, so the movement ranges of the wire in X, Y and Z directions are limited. Compared with the prior art, the invention has better fixing effect. In addition, as the wire fixing frame has better fixing effect, the wire of the backlight module is not easy to be damaged in movement.

In order to make the aforementioned and other features and advantages of the invention comprehensible, embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
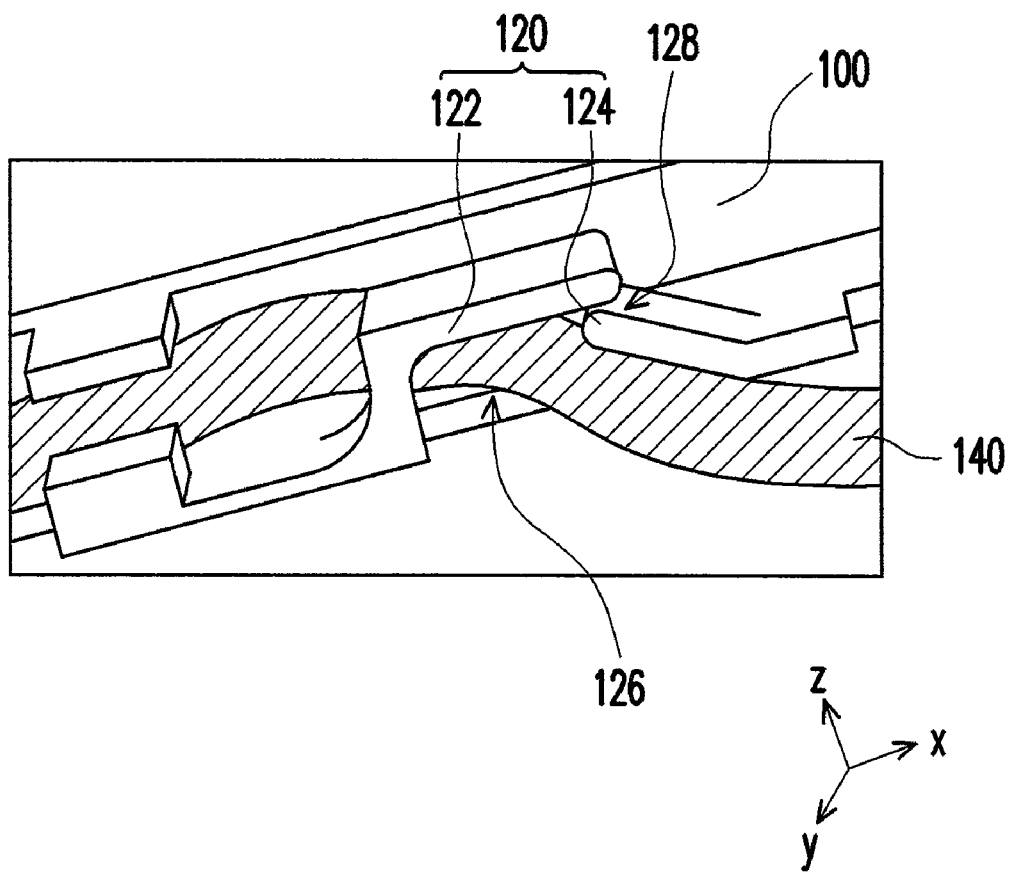
FIG. 1 is a schematic enlarged view of a part of a conventional wire fixing structure.
Figure 2A:
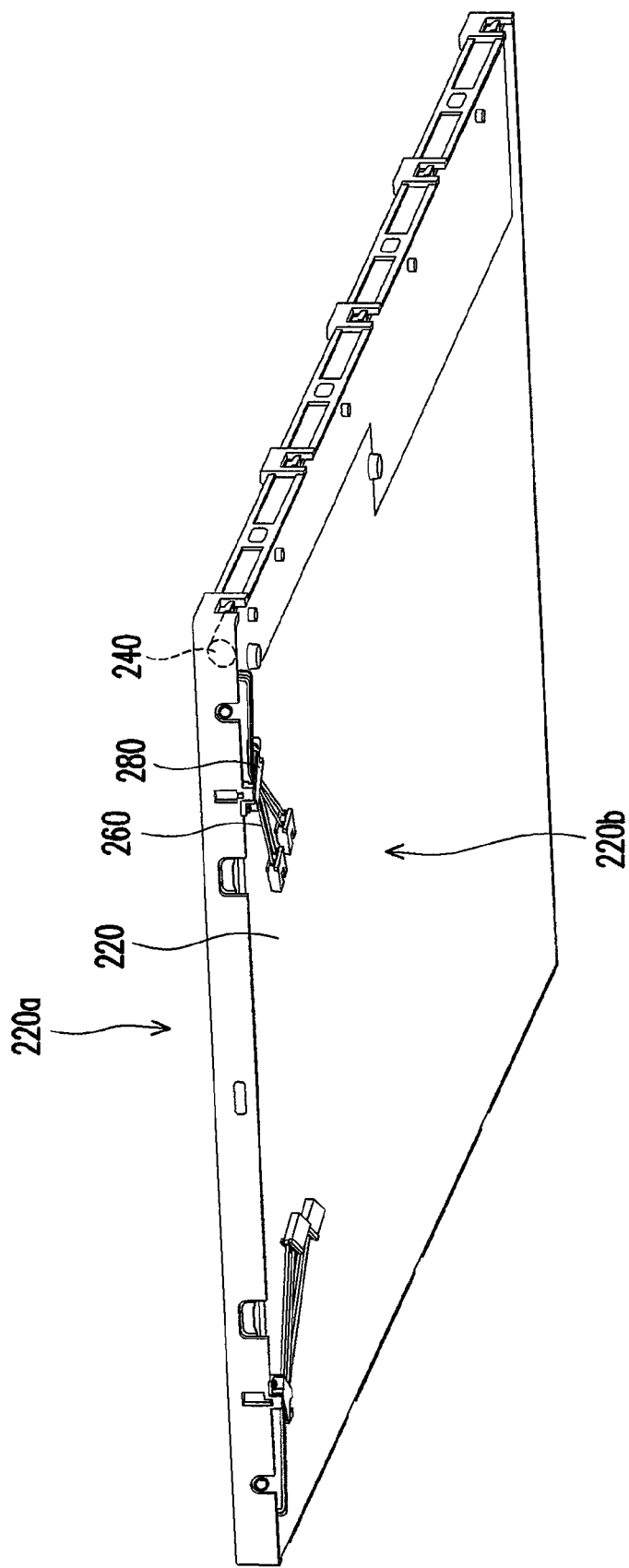
FIG. 2A is a schematic view of a backlight module according to an embodiment of the invention.
Figure 2B:
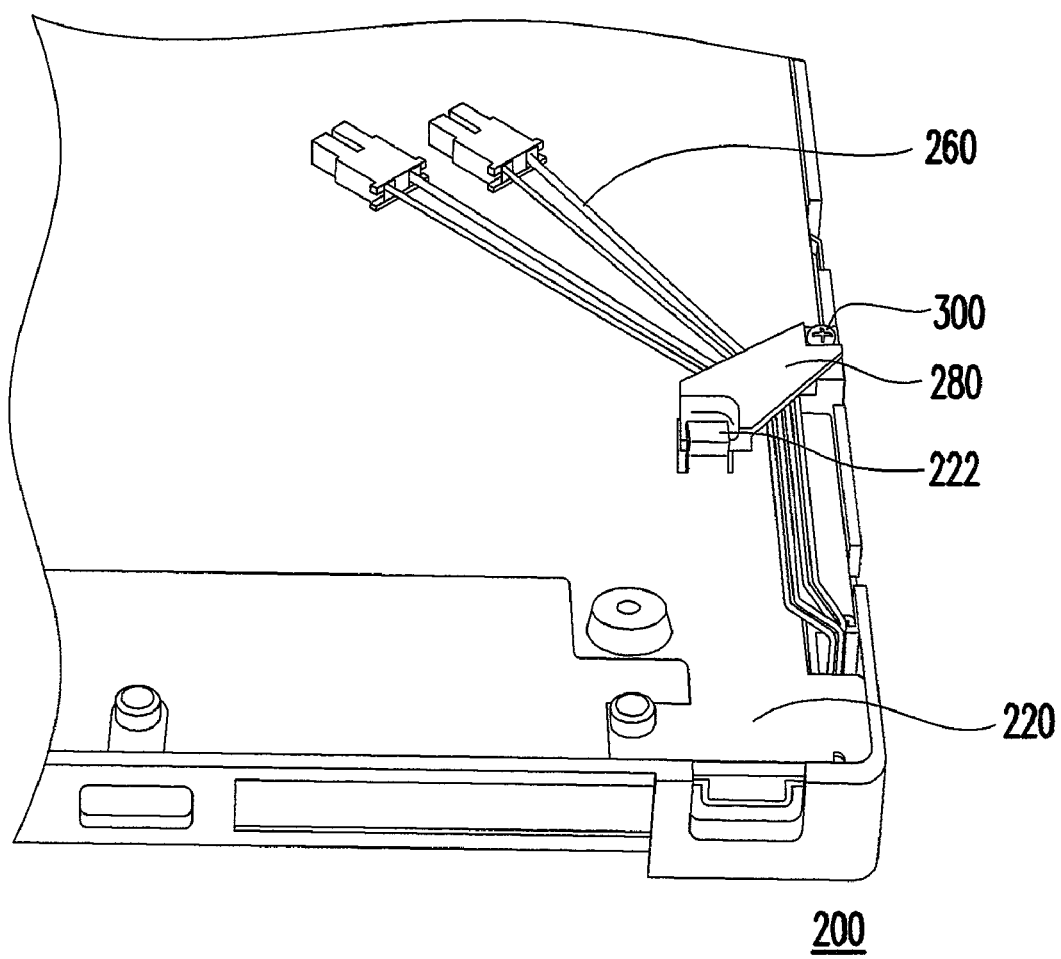
FIG. 2B is a schematic enlarged view of a part of FIG. 2A.

FIG. 2A is a schematic view of a backlight module according to an embodiment of the invention. FIG. 2B is a schematic enlarged view of a part of FIG. 2A. Referring to FIGS. 2A and 2B, the backlight module 200 of this embodiment is a side incident type backlight module 200, which is applicable to a display, e.g., an LCD display. The backlight module 200 includes a back plate structure 220, a light source 240, at least one wire 260, and at least one wire fixing frame 280. The light source 240 is disposed in the back plate structure 220, and the light source 240, for example, is a cold cathode fluorescent lamp (CCFL) or a light-emitting diode (LED). In this embodiment, the light source 240 is disposed on a side of the back plate structure 220. The light generated by the light source 240 will be emitted from a front surface 220a of the back plate structure 220 in form of a surface light source. In addition, the wire 260 is connected to the light source 240, and the wire 260 is used for electrically connecting the light source 240 and a power supplier. Normally, the wire 260 connected to the light source 240 will be fixed on a rear surface 220b of the back plate structure 220. In this embodiment, the wire 260 is fixed to the rear surface of the back plate structure 220 through the wire fixing frame 280.

Figure 3:
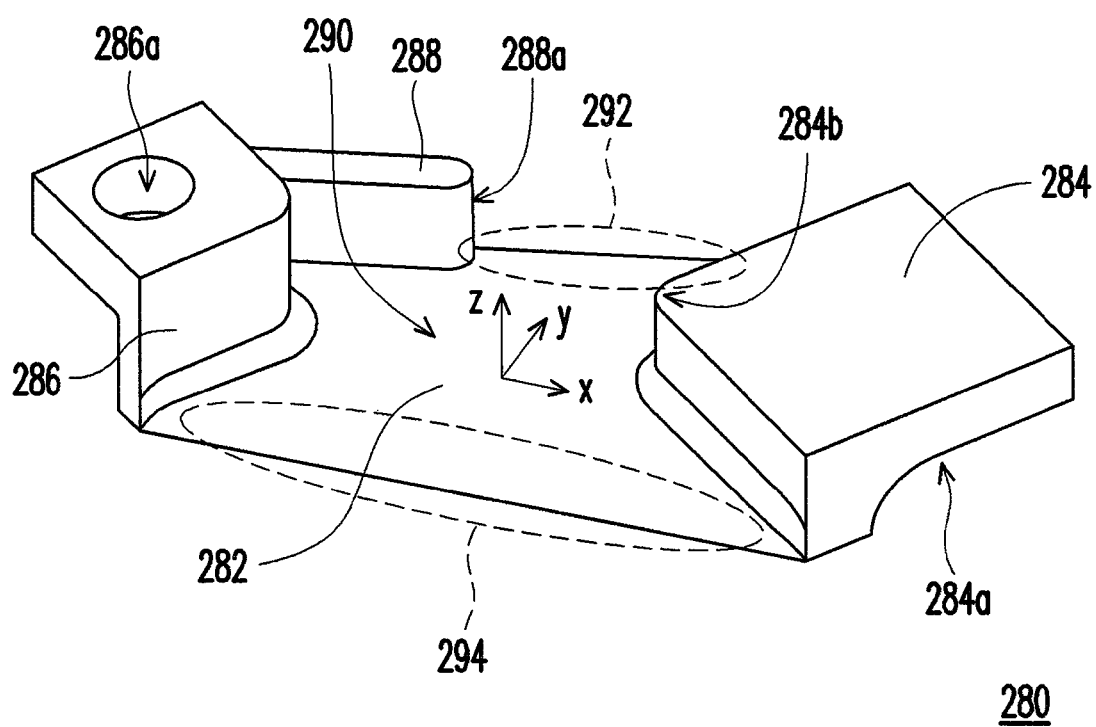
FIG. 3 is a schematic enlarged view of the wire fixing frame of FIG. 2A.

FIG. 3 is a schematic enlarged view of the wire fixing frame 280. Referring to FIG. 3, the wire fixing frame 280 includes a main part 282, a first fixing part 284, a second fixing part 286, and an extending part 288. It should be noticed that the main part 282, the first fixing part 284, the second fixing part 286, and the extending part 288 may be a one-piece formed structure, and for example, made of plastic or metals.

In particular, the first fixing part 284 is disposed on a side of the main part 282, and an upper surface of the first fixing part 284 protrudes from the surface of the main part 282. Moreover, the upper surface of the first fixing part 284 may be quadrangular. When the wire fixing frame 280 is fixed on the back plate structure, the upper surface of the first fixing part 284 will contact with the back plate structure 220 (as shown in FIGS. 2A and 2B). Moreover, the first fixing part 284 has a round corner 284b at a central portion near the main part 282, for limiting the movement of the wire 260 in the Y direction. Besides, a lower surface of the first fixing part 284 further includes a recessed buckling member 284a directly buckled on the back plate structure 220. For example, the back plate structure 222 has a restriction element 222 (shown in FIGS. 2B and 4), and the recessed buckling member 284a is buckled by the restriction element 222. For example, the back plate structure 220 has a limiting bump 222 (shown in FIGS. 2B and 4), and the limiting bump 222 is used to be buckled with the recessed buckling member 284a.

In addition, the second fixing part 286 is disposed on a side of the main part 282, and is opposite to the first fixing part 284. An upper surface of the second fixing part 286 protrudes from the surface of the main part 282. When the wire fixing frame 280 is fixed on the back plate structure 220, the upper surface of the second fixing part 286 will contact with the back plate structure 220 (as shown in FIGS. 2A and 2B). In one embodiment, a height of the second fixing part 286 is higher than a height of the first fixing part 284. In one embodiment, the backlight module 200 further includes at least one locking member 300, the upper surface of the second fixing part 286 has a fixing hole 286a, and the second fixing part 286 is fixed on the back plate structure 220 through the fixing hole 286a and the locking member 300.

Particularly, the locking member 300, for example, is a screw or a bolt. In this embodiment, when the wire fixing frame 280 is to be fixed on the back plate structure 220, the recessed buckling member 284a of the first fixing part 284 is buckled on the back plate structure 220, then the wire fixing frame 280 is locked on the back plate structure 220 with the locking member 300 through the fixing hole 286a of the second fixing part 286. Therefore, the wire fixing frame 280 of this embodiment is a structure easy to manufacture, convenient to assemble, and convenient to rework.

In addition, the wire fixing frame 280 further includes an extending part 288, as shown in FIG. 3, which, for example, is a rectangular block. The extending part 288 extends in a direction from the second fixing part 286 to the first fixing part 284, for limiting the movement of the wire 260 in the X direction. In one embodiment, an end of the extending part 288 is a rounded end 288a, so as to protect the wire 260 from being damaged. Moreover, a height of the extending part 288, for example, is equal to or similar to the height of the first fixing part 284.

Particularly, referring to FIGS. 2A, 2B and 3 together, a wire outlet 292 is defined between the extending part 288 and the first fixing part 284, and a wire inlet 294 is opposite to the wire outlet 292. A wire hold space 290 is defined among the main part 282, the first fixing part 284, the second fixing part 286, and the back plate structure 220. Therefore, the wire 260 passes from the wire inlet 294 to the wire outlet 292 through the wire hold space 290. At this time, the wire 260 is limited at a position by the round corner 284b of the first fixing part 284 and the extending part 288.

More particularly, as the wire hold space 290 is defined by the main part 282, the first fixing part 284, the second fixing part 286, and the back plate structure 220, the height of the wire hold space 290 will be defined by the first fixing part 284, the second fixing part 286, and the extending part 288. Therefore, by controlling the heights of the first fixing part 284, the second fixing part 286, and the extending part 288, the height of the wire hold space 290 formed after the wire fixing frame 280 and the back plate structure 220 are combined can be controlled. Thus, the wire 260 will be limited by the height of the wire hold space 290 inside the wire hold space 290 in the Z direction.

Figure 4:
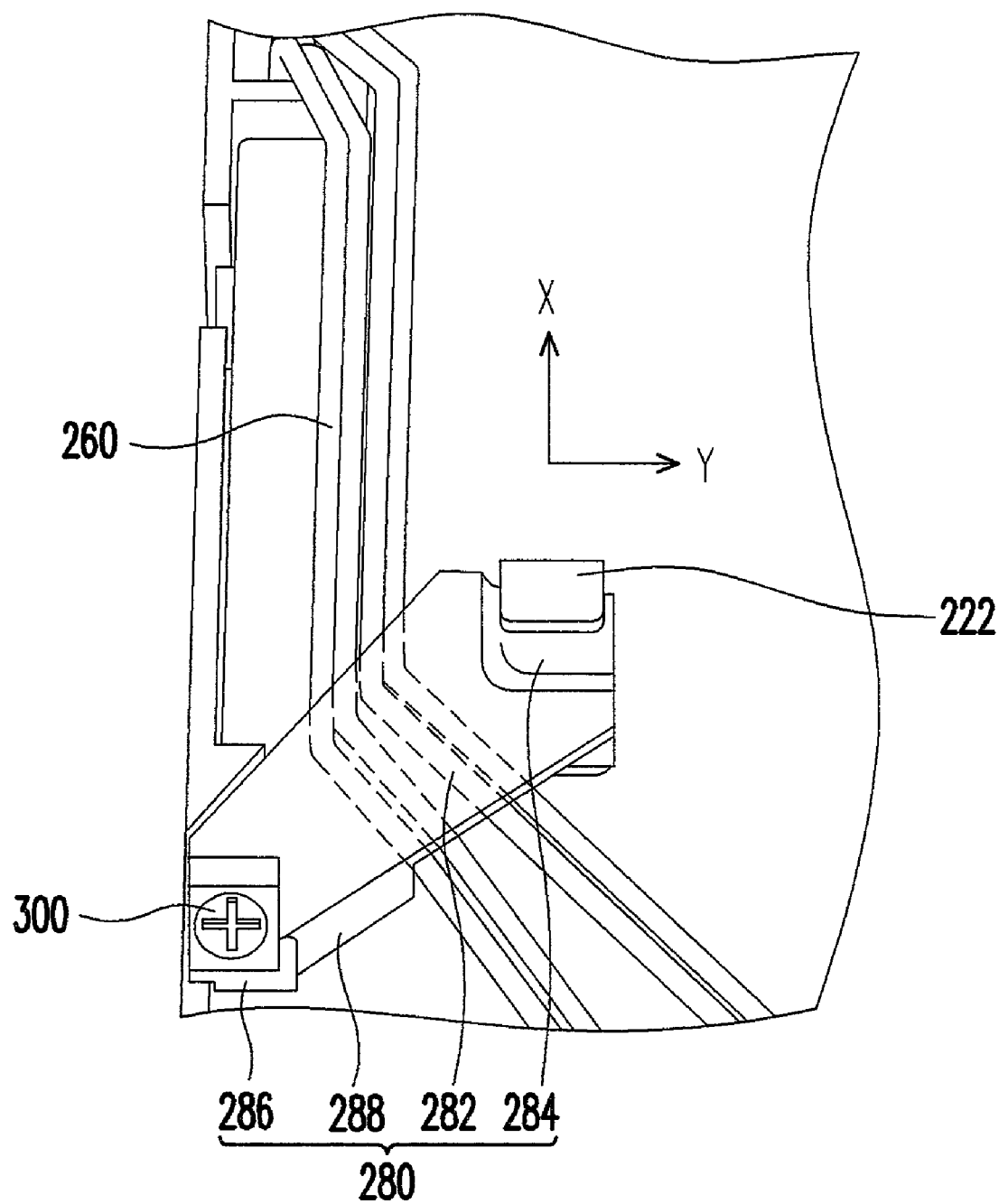
FIG. 4 is a schematic view of limiting the wire in the wire fixing frame structure.

In addition, referring to FIG. 4, when the wire 260 is torn in the Y direction, the wire 260 will be retained by the round corner 284b of the first fixing part 284, and will not be easily broken due to the tearing in the Y direction. When the wire 260 is torn in the X direction, the wire 260 will be retained by the extending part 288, and will not be easily broken due to the tearing in the X direction. Therefore, when the wire fixing frame 280 is used to fix the wire 260, the position of the wire 260 can be limited, i.e., the wire 260 will be retained in the X, Y and Z direction, so as to prevent the wire 260 from being torn broken in movement.

Furthermore, the wire fixing frame is not limited to being applied in backlight modules only in the invention. In fact, the wire fixing frame of the invention is also applicable to other devices, and all applications of fixing wires on a substrate (such as the back plate structure) can use the wire fixing structure to fix the wires.

In the above backlight module 200, in order to prevent the light leakage caused by breaches due to an L-shaped positioning structure designed on the back plate structure 220 for buckling the recessed buckling member 284a, and to prevent the lamp wire fixing frame from loosing due to deformation of the L-shaped positioning structure when the lamp wire fixing frame is applied with a large external force, the invention further provides another implementation of using a limiting bump on the back plate structure together with another wire fixing frame, thus avoiding the light leakage, and preventing the possible positioning failure of the wire fixing frame due to large external force.

Figure 5A:
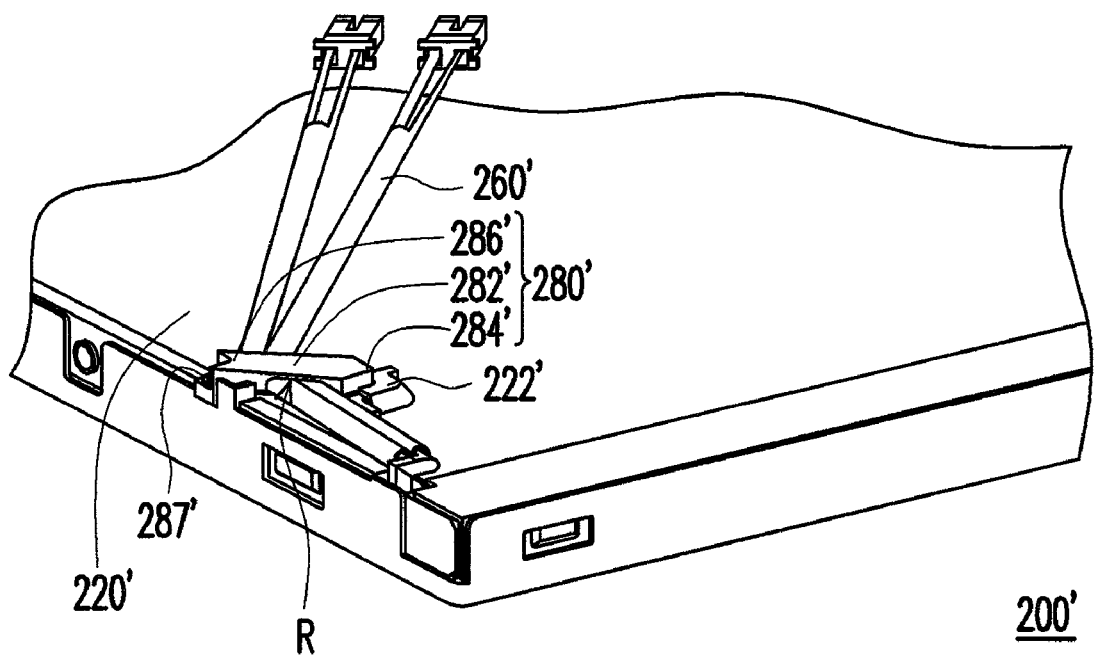
FIGS. 5A and 5B are schematic three-dimensional views of a backlight module from different visual angles according to another embodiment of the invention.
Figure 5B:
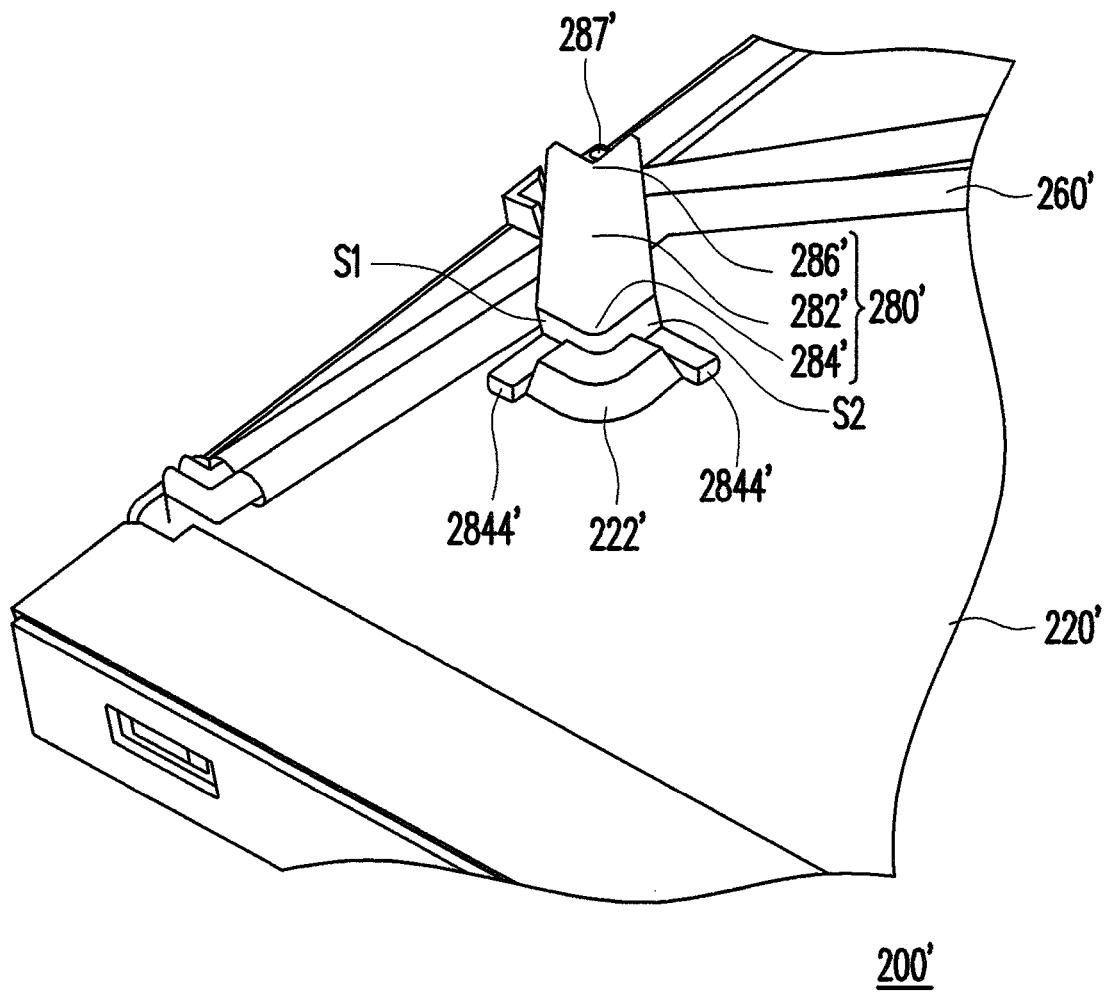
Figure 6:
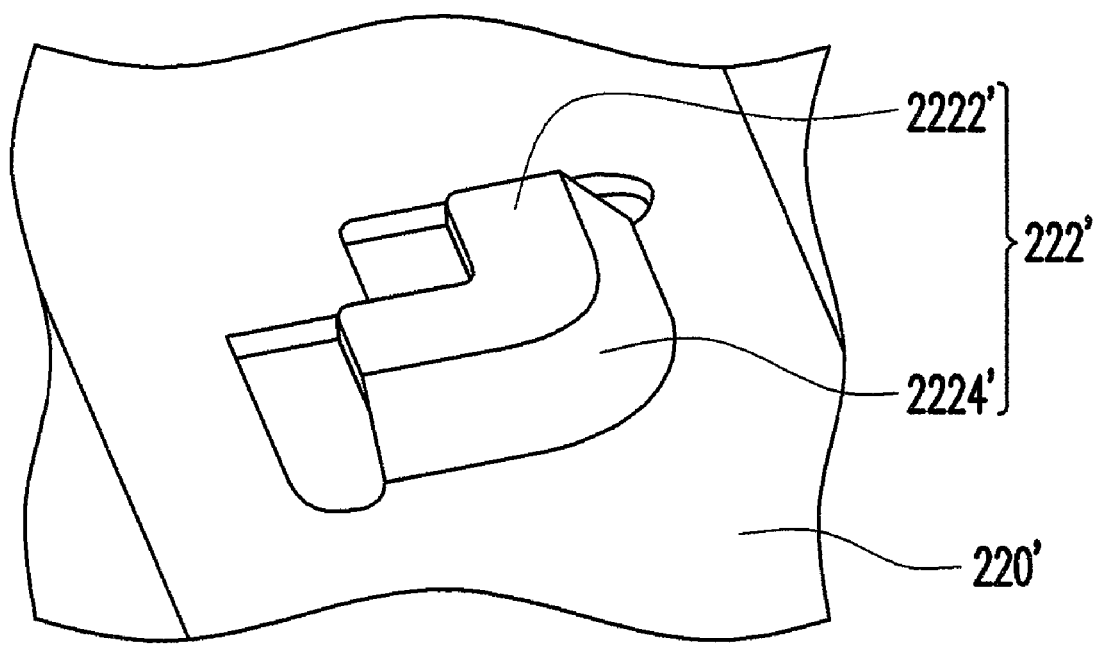
FIG. 6 is a schematic three-dimensional view of the limiting bump shown in FIG. 5A and FIG. 5B.
Figure 7A:
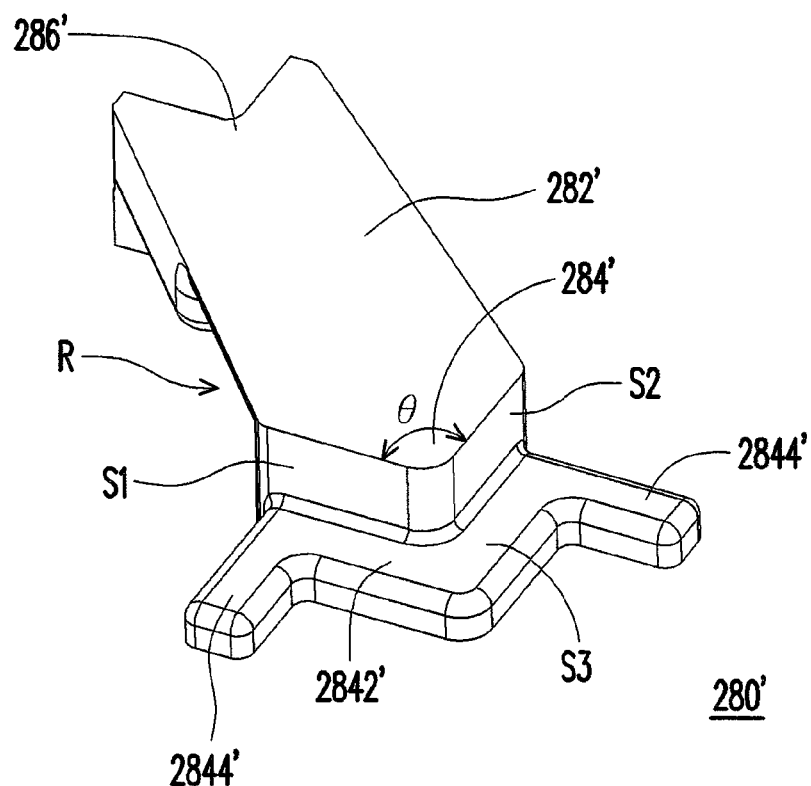
FIGS. 7A and 7B are schematic three-dimensional views of the wire fixing frame from different visual angles.
Figure 7B:
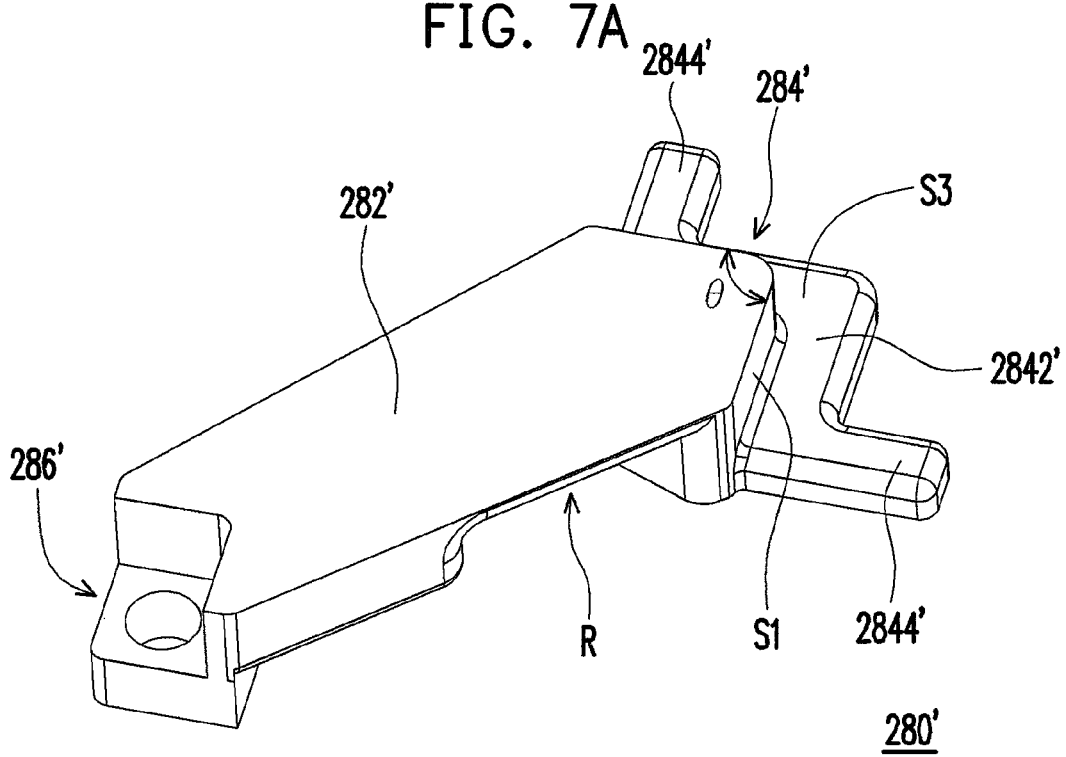

FIGS. 5A and 5B are schematic three-dimensional views of a backlight module from different visual angles according to another embodiment of the invention. FIG. 6 is a schematic three-dimensional view of the limiting bump shown in FIG. 5A and FIG. 5B. FIGS. 7A and 7B are schematic three-dimensional views of the wire fixing frame from different visual angles. Referring to FIGS. 5A and 5B, the backlight module 200' also includes a back plate structure 220', a light source (not shown), at least one wire 260', and a wire fixing frame 280'. As shown in FIG. 5A, FIG. 5B, and FIG. 6, a limiting bump 222' is formed on the back plate structure 220'. Further, referring to FIG. 6, the limiting bump 222' includes a limiting wall 2222' and a connecting wall 2224' connected between the limiting wall 2222' and the back plate structure 220'. In this embodiment, the light source is disposed at a side edge of the back plate structure 220', and thus is not shown in the figure. The wire 260' is connected to the light source, such that the light source is electrically connected with the power supplier.

As shown in FIGS. 5A and 5B, the wire fixing frame 280' is disposed on the back plate structure 220', so as to position the wire 260' by using the limiting bump 222' and the wire fixing frame 280' together. Further, referring to FIGS. 7A and 7B, the wire fixing frame 280' includes a main part 282', a first fixing part 284', and a second fixing part 286'. The main part 282' has a wire accommodation slot R at a surface facing the back plate structure 220'. As shown in FIG. 5A, the wire 260' is positioned between the wire accommodation slot R and the back plate structure 220'. Still referring to FIGS. 7A and 7B, the first fixing part 284' is disposed at a side of the main part 282', and the first fixing part 284' has a first limiting sidewall S1, a second limiting sidewall S2, and a step part 2842'. The first limiting sidewall S1 and the second limiting sidewall S2 form an included angle θ. One side of the step part 2842' has a third limiting sidewall S3 connected to the first limiting sidewall S1 and the second limiting sidewall S2, and the third limiting sidewall S3 is substantially perpendicular to the first limiting sidewall S1 and the second limiting sidewall S2. The other side of the step part 2842' abuts against the back plate structure 220'. The second fixing part 286' is disposed at the other side of the main part 282'. As shown in FIG. 5A, the second fixing part 286' is fixed on the back plate structure 220' through a positioning member 287'. In this embodiment, the positioning member 287' is a screw, and the second fixing part 286' is locked on the back plate structure 220' through the screw.

Referring to FIG. 5A again, when it intends to use the wire fixing frame 280' to fix the wire 260' on the back plate structure 220', the user may first place the wire 260' in the wire accommodation slot R of the wire fixing frame 280', then buckles the limiting bump 222' on the back plate structure 220' with the third limiting sidewall S3 of the step part 2842', such that the wire fixing frame 280' may not shift longitudinally. As shown in FIG. 6 and FIG. 7A, the limiting wall 2222' of the limiting bump 222' and the third limiting sidewall S3 have the same shape, and thus when the limiting bump 222' is buckled with the third limiting sidewall S3 of the step part 2842', the limiting wall 2222' is supported on the third limiting sidewall S3 of the step part 2842', and the inner edge of the limiting wall 2222' abuts against the first limiting sidewall S1 and the second limiting sidewall S2. Therefore, the wire fixing frame 280' may be avoided from shifting transversely. Finally, the positioning member 287', for example, the screw, is used to fix the second fixing part 286' of the wire fixing frame 280' on the back plate structure 220'. The limiting bump 222' has a higher structural strength than the L-shaped positioning structure for buckling the recessed buckling member 284a shown in FIG. 2B, and thus when the lamp wire 260' is applied with an external force, the limiting bump 222' is less likely to generate plastic deformation, thereby avoiding the positioning failure.

Moreover, in order to prevent the light leakage caused by breaches due to the L-shaped positioning structure fabricated on the back plate structure 220 for buckling the recessed buckling member 284a as shown in FIG. 2B, referring to FIG. 7A, the first fixing part 284' of the wire fixing frame 280' further includes two light leakage shielding pins 2844' disposed on two opposite sides of the step part 2842' respectively. Referring to FIG. 5B, when the limiting bump 222' is buckled with the step part 2842', two side edges of the limiting bump 222' are respectively supported on the light leakage shielding pins 2844' correspondingly, and thus the light leakage shielding pins 2844' may prevent the light leakage.

In view of the above, the invention adopts the round corner of the first fixing part, and the height structures of the extending part and the wire accommodation part in the wire fixing frame, thus limiting the moving range of the wire at three directions, namely, X, Y, Z directions, and having preferred fixing effect as compared with the prior art. In addition, the wire fixing frame has preferred fixing effect, such that the wire of the backlight module is less likely to be damaged during transportation.

Furthermore, the invention also provides another type of wire fixing frame, so as to avoid light leakage by using the light leakage shielding pins on the wire fixing frame and changing the shape of the limiting bump on the back plate structure, thereby avoiding the possible positioning failure of the wire fixing frame due to large external force.

It will be apparent to persons of ordinary art in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A backlight module, comprising:
    a back plate structure;
    a light source, disposed in the back plate structure;
    at least one wire, connected to the light source; and
    at least one wire fixing frame, fixed on the back plate structure, wherein each wire fixing frame comprises:
    a main part;
    a first fixing part, disposed on a side of the main part, wherein an upper surface of the first fixing part protrudes from a surface of the main part and contacts with the back plate structure, and the first fixing part has a round corner in a central portion near the main part;
    a second fixing part, disposed on a side of the main part, and opposite to the first fixing part, wherein an upper surface of the second fixing part protrudes from the surface of the main part and contacts with the back plate structure; and
    an extending part, extending in a direction from the second fixing part to the first fixing part;
    wherein a wire outlet is defined between the extending part and the first fixed part, and a wire inlet is opposite to the wire outlet, a wire hold space is defined among the main part, the first fixing part, the second fixing part, and the back plate structure, the wire passes from the wire inlet to the wire outlet through the wire hold space, and the wire is fixed at a position by the round corner of the first fixing part and the extending part.

2. The backlight module as claimed in claim 1, wherein a lower surface of the first fixing part has a recessed buckling member buckled on the back plate structure.

3. The backlight module as claimed in claim 2, wherein the back plate structure comprises a limiting bump, and the limiting bump is buckled with the recessed buckling member.

4. The backlight module as claimed in claim 1, further comprising at least one locking member, wherein the upper surface of the second fixing part has a fixing hole, and the second fixing part is fixed on the back plate structure through the fixing hole and the locking member.

5. The backlight module as claimed in claim 1, wherein the main part, the first fixing part, the second fixing part, and the extending part are one-piece formed.

6. The backlight module as claimed in claim 1, wherein the upper surface of the first fixing part is quadrangular.

7. The backlight module as claimed in claim 1, wherein the extending part is a rectangular block.

8. The backlight module as claimed in claim 1, wherein an end of the extending part is a rounded end.

9. The backlight module as claimed in claim 1, wherein a height of the first fixing part is lower than a height of the second fixing part.

10. The backlight module as claimed in claim 1, wherein a height of the extending part is equal to or similar to the height of the first fixing part.

11. A backlight module, comprising:
    a back plate structure, comprising a limiting bump;
    a light source, disposed in the back plate structure;
    a wire, connected to the light source; and
    a wire fixing frame, disposed on the back plate structure, so as to position the wire by using the limiting bump and the wire fixing frame together, the wire fixing frame comprising:
    a main part, comprising a wire accommodation slot on a surface facing the back plate structure, wherein the wire is positioned between the wire accommodation slot and the back plate structure;
    a first fixing part, disposed on a side of the main part, and comprising a first limiting sidewall, a second limiting sidewall, and a step part, wherein the first limiting sidewall and the second limiting sidewall form an included angle, one side of the step part comprises a third limiting sidewall connected to the first limiting sidewall and the second limiting sidewall, the third limiting sidewall is substantially perpendicular to the first limiting sidewall and the second limiting sidewall, the other side of the step part abuts against the back plate structure, the limiting bump is buckled with the third limiting sidewall of the step part, and an inner edge of the limiting bump abuts against the first limiting sidewall and the second limiting sidewall;

a second fixing part, disposed on the other side of the main part, wherein the second fixing part is fixed on the back plate structure through a positioning member, the first fixing part further comprises two light leakage shielding pins disposed on two opposite sides of the step part respectively, and two side edges of the limiting bump are respectively supported on the light leakage shielding pins correspondingly.

12. The backlight module as claimed in claim 11, wherein the limiting bump comprises a limiting wall and a connecting wall connected between the limiting wall and the back plate structure, the limiting wall is supported on the third limiting sidewall of the step part and has the same shape with the third limiting sidewall, and an inner edge of the limiting wall abuts against the first limiting sidewall and the second limiting sidewall.

13. The backlight module as claimed in claim 11, wherein the second fixing part is fixed on the back plate structure by locking through a screw.

* * * * *